B. F. LUKE.
SOIL WORKING ATTACHMENT FOR AGRICULTURAL IMPLEMENTS.
APPLICATION FILED JAN. 29, 1909.
923,057.
Patented May 25, 1909.
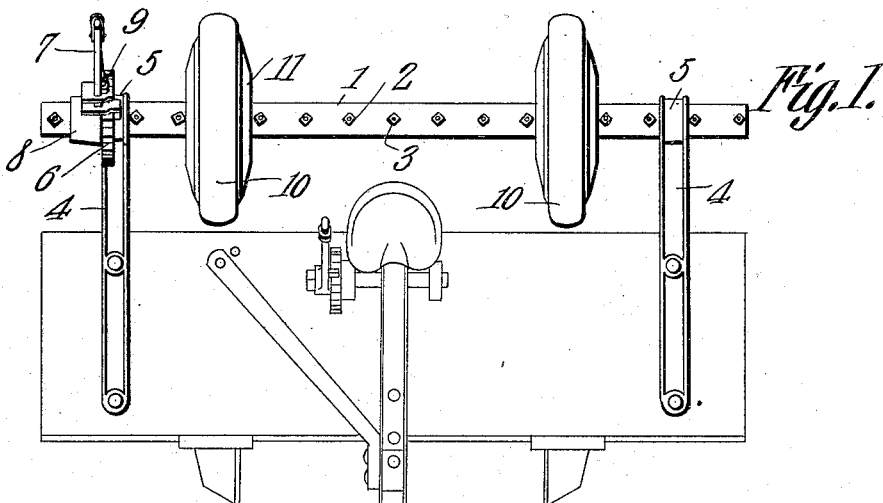
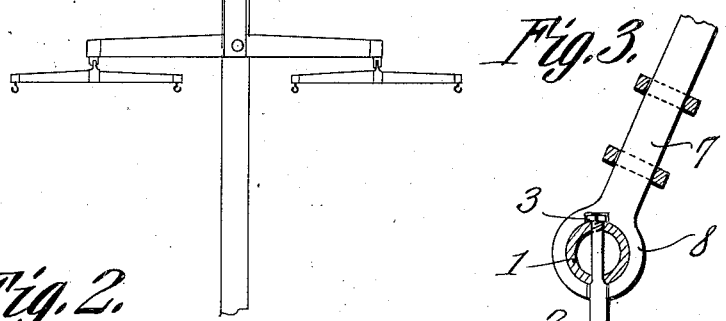
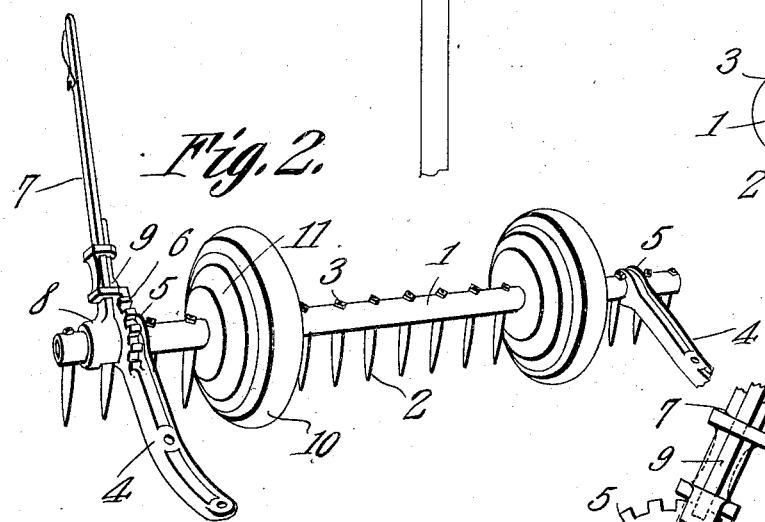
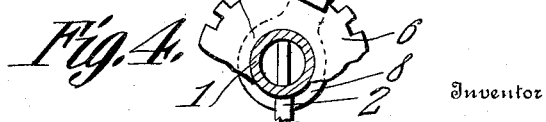
Witnesses
Inventor
Benjamin F. Luke,
By C. A. Snow & Co.
Attorneys

UNITED STATES PATENT OFFICE.

BENJAMIN F. LUKE, OF ORANGEVILLE, UTAH, ASSIGNOR TO B. F. LUKE CO., OF SALT LAKE CITY, UTAH, A CORPORATION.

SOIL-WORKING ATTACHMENT FOR AGRICULTURAL IMPLEMENTS.

No. 923,057.      Specification of Letters Patent.      Patented May 25, 1909.

Application filed January 29, 1909. Serial No. 474,908.

*To all whom it may concern:*

Be it known that I, BENJAMIN F. LUKE, a citizen of the United States, residing at Orangeville, in the county of Emery and State of Utah, have invented a new and useful Soil-Working Attachment for Agricultural Implements, of which the following is a specification.

This invention has relation to soil-working attachment for agricultural implements, and it consists in the novel construction and arrangement of its parts, as hereinafter shown and described.

Primarily the attachment is designed to be applied to a soil pulverizer or compactor, as, for instance, a roller or drag, but it may be applied to any kind of agricultural implement designed to prepare the soil for planting, or which may be used for leveling the soil for cultivating purposes.

The object of the invention is to provide an attachment of the character indicated which comprises a bar having detachable harrow teeth mounted thereon and supporting wheels journaled thereon and which are held in adjusted positions along the bar by means of the said harrow teeth. Arms provided with bearings receive the end portions of the said bar and are adapted to be connected with the implement to which the attachment is applied, and means is provided upon one of the said arms for swinging the bar, whereby the harrow teeth may be elevated or lowered as desired.

In the accompanying drawings:—Figure 1 is a top plan view, showing the attachment applied to an implement: Fig. 2 is a perspective view of the attachment: Fig. 3 is a transverse sectional view of a portion of the attachment. Fig. 4 is a transverse sectional view of a portion of the attachment, showing a pawl and gear segment used thereon.

The attachment consists of a bar 1, which is preferably in the form of a pipe, and at suitable intervals upon the same are secured the harrow teeth 2, the shanks of which pass transversely through the said bar and are secured by means of the nuts 3 screw-threaded upon the end portions of the said shanks of the teeth. The arms 4 are adapted to be connected at their forward ends with the frame of an agricultural implement such as above indicated, and are provided at their rear ends with the bearings 5, in which the end portions of the bar 1 are journaled. One of the arms 5 is provided at its rear end with a gear segment 6, and the lever 7 is provided with a sleeve 8, which is adapted to be fixed to the bar adjacent to the rear end of that arm 4 which carries the gear segment 6. The lever 7 is provided with a pawl 9, which is adapted to engage the teeth of the segment 6.

The wheels 10 are loosely journaled upon the intermediate portion of the bar 1, and are held against lateral movement thereon by the adjacent teeth 2, mounted upon the said bar. The wheels 10 are provided at their opposite sides with the frusto-conical portions 11, which materially increase the transverse thickness of the said wheels and constitute, at their outer faces, bearing surfaces adapted to engage the adjacent teeth to the said wheels which are carried by the bar 1.

By such an arrangement it will be observed that by swinging the lever 7 the teeth 2 may be caused to operate at a greater or less degree below the surface of the ground, or the said lever 7 may be swung so that the pointed ends of the teeth 2 will be upwardly disposed, and all portions of the teeth will be elevated above the surface of the ground. It will also be seen that, by removing the intermediate teeth 2 of the bar 1, the wheels 10 may be shifted laterally longitudinally of the bar, and, by reinserting the said teeth in their respective perforations, the said wheels will be held in adjusted positions upon the bar. It will also be seen that, by removing adjacent teeth, the arms 4 may be adjusted laterally along the longitudinal dimension of the bar 1. The advantage gained by providing means for adjustably positioning the arms and the wheels upon the said bar is that the arms may be spread sufficiently to be connected with the frame of the implement at desired points, and also the wheels 10 may be spaced apart so as to follow plows or soil-openers carried by the implement, the wheels being of such configuration as to follow in the furrows and prevent the teeth carried by the bar 1 from casting the soil into the said furrows. At the same time the said wheels will compact the sides of the said furrows, and leave the same in proper condition for the reception of seed or the flowing of water therein.

Having described my invention, what I claim as new, and desire to secure, by Letters Patent, is:—

1. A bar, teeth carried by the bar, supporting wheels adjustably mounted upon the bar, said teeth forming means for retaining the wheels in adjusted position.

2. A bar, teeth carried by the bar, supporting wheels journaled on the bar, arms having bearings which receive the bar, one of the arms having a segment, and a lever attached to the bar and carrying a pawl for engagement with the segment.

3. A bar, teeth carried by the bar, supporting wheels journaled on the bar, arms having bearings which receive the bar, and means for turning the bar in the bearings of the arms.

4. A bar, teeth carried by the bar, supporting wheels journaled on the bar, arms having bearings which receive the bar and which lie between adjacent teeth, said teeth forming means for retaining the bearings against longitudinal movement on the bar.

In testimony that I claim the foregoing as my own, I have hereto affixed my signature in the presence of two witnesses.

BENJAMIN F. LUKE.

Witnesses:
   JOSEPH O. LUKE,
   JOHN S. CURTIS.